(12) United States Patent
Oguchi et al.

(10) Patent No.: US 12,555,497 B2
(45) Date of Patent: Feb. 17, 2026

(54) LABEL STRUCTURE AND LABEL

(71) Applicant: SATO HOLDINGS KABUSHIKI KAISHA, Tokyo (JP)

(72) Inventors: Kentaro Oguchi, Minato-ku (JP); Yuko Saito, Minato-ku (JP)

(73) Assignee: SATO CORPORATION, Tokyo (JP)

( * ) Notice: Subject to any disclaimer, the term of this patent is extended or adjusted under 35 U.S.C. 154(b) by 226 days.

(21) Appl. No.: 18/282,894

(22) PCT Filed: Mar. 30, 2022

(86) PCT No.: PCT/JP2022/016303
§ 371 (c)(1),
(2) Date: Sep. 19, 2023

(87) PCT Pub. No.: WO2022/210977
PCT Pub. Date: Oct. 6, 2022

(65) Prior Publication Data
US 2024/0177633 A1 May 30, 2024

(30) Foreign Application Priority Data

Mar. 30, 2021 (JP) ................................. 2021-058193
Mar. 30, 2022 (JP) ................................. 2022-056114

(51) Int. Cl.
*G09F 3/02* (2006.01)
*B32B 3/26* (2006.01)
*B32B 7/12* (2006.01)

(52) U.S. Cl.
CPC ............ *G09F 3/0288* (2013.01); *B32B 3/266* (2013.01); *B32B 7/12* (2013.01); *B32B 2307/75* (2013.01);
(Continued)

(58) Field of Classification Search
CPC ....... G09F 2003/023; G09F 2003/0257; G09F 2003/0269; G09F 2003/0201; G09F 2003/0222; G09F 3/02; G09F 3/10
See application file for complete search history.

(56) References Cited

U.S. PATENT DOCUMENTS 5,900,610 A * 5/1999 Kelly, Jr. .............. G09F 3/0288
235/487
10,460,631 B1 10/2019 Valenti et al.
(Continued)

FOREIGN PATENT DOCUMENTS

JP      2004-117787 A    4/2004
JP      2008-026536 A    2/2008
(Continued)

*Primary Examiner* — Gary C Hoge
(74) *Attorney, Agent, or Firm* — Foley & Lardner LLP (57) ABSTRACT

A label structure includes: a base material including a print area on which information arranged in a predetermined direction is printed on a front surface of the base material; an adhesive portion in which an adhesive is laminated on a back surface of the base material; and a separator configured to cover the adhesive portion. At least the print area of the base material is formed with a base material partition portion partitioned by a base material tear-off line, the base material partition portion includes a plurality of intersections extending in a direction intersecting with the predetermined direction, and the separator is formed with a separator partition portion partitioned by a separator tear-off line in an area corresponding to at least a part of an area corresponding to the base material partition portion.

9 Claims, 10 Drawing Sheets

(52) U.S. Cl.
CPC .... *B32B 2519/00* (2013.01); *G09F 2003/023* (2013.01); *G09F 2003/0257* (2013.01); *G09F 2003/0269* (2013.01)

(56) References Cited

U.S. PATENT DOCUMENTS

| | | | | |
|---|---|---|---|---|
| 2005/0196573 A1* | 9/2005 | Myers | ............... | G09F 3/0292 |
| | | | | 428/40.1 |
| 2005/0258636 A1* | 11/2005 | Bova | ............ | G09F 3/10 |
| | | | | 283/81 |
| 2006/0257608 A1* | 11/2006 | Severn | ............. | G09F 3/0292 |
| | | | | 428/40.1 |
| 2008/0102238 A1* | 5/2008 | Swords | ............. | G09F 3/0292 |
| | | | | 428/40.1 |

FOREIGN PATENT DOCUMENTS

| | | | |
|---|---|---|---|
| JP | 2008-250005 | A | 10/2008 |
| JP | 2015-000563 | A | 1/2015 |
| JP | 2020-023059 | A | 2/2020 |
| JP | 2020-024252 | A | 2/2020 |
| JP | 2020-032538 | A | 3/2020 |

\* cited by examiner

LABEL STRUCTURE AND LABEL

TECHNICAL FIELD

The present invention relates to a label structure and a label.

BACKGROUND ART

When a package is shipped, a label on which personal information such as an address, a name, and a telephone number of a sender or an addressee is printed is adhered to the package. From a viewpoint of personal information protection, these labels are disposed together with an outer packaging material of the package after delivery, or are disposed after being peeled off from the outer packaging material.

For such use, JP2008-26536A proposes a label in which a portion of the label on which personal information is printed can be easily tore off.

The label described in JP2008-26536A is subjected to a process of weakening an adhesive strength of a glue on a back surface of the portion on which the personal information is printed, and the label is tore by a perforation line, so that the portion of the label on which the personal information is printed can be peeled off from an outer packaging material, which is an adherend, and collected.

SUMMARY OF INVENTION

In JP2008-26536A, the portion of the label on which the personal information is printed can be peeled off and collected, but the portion of the label on which the personal information is printed needs to be further cut by a shredder or the like.

Therefore, an object of the invention is to enable a label to be held on a front surface of an adherend while the label is in use, and information written on the label to be easily disposed.

According to an aspect of the invention, there is provided a label structure including: a base material including a print area on which information arranged in a predetermined direction is printed on one surface of the base material; an adhesive portion in which an adhesive is laminated on the other surface of the base material; and a separator configured to cover the adhesive portion. At least the print area of the base material is formed with a base material partition portion partitioned by a base material tear-off line, the base material partition portion includes a plurality of intersections extending in a direction intersecting with the predetermined direction, and the separator is formed with a separator partition portion partitioned by a separator tear-off line in an area corresponding to at least a part of an area corresponding to the base material partition portion.

According to the above aspect, the base material partition portion, including the plurality of intersections extending in the direction intersecting with, rather than being parallel to, the information arranged in the predetermined direction and printed on the print area of the base material, is partitioned by the base material tear-off line. Therefore, when a user tears off the base material partition portion, the information printed on the base material is divided in the intersecting direction. Accordingly, the information printed on the base material can be disposed in such a way that the information cannot be recognized by a third party.

Further, on the other surface of the base material partition portion, the separator partition portion partitioned by the separator tear-off line is formed in an area corresponding to the base material partition portion. Therefore, in the label, a back surface of the base material partition portion is not adhered to an adherend. Accordingly, the user can easily remove the base material partition portion from the adherend when the base material partition portion is tore from the label.

DESCRIPTION OF EMBODIMENTS

First Embodiment

<Configuration of Label Structure>

Figure 1:
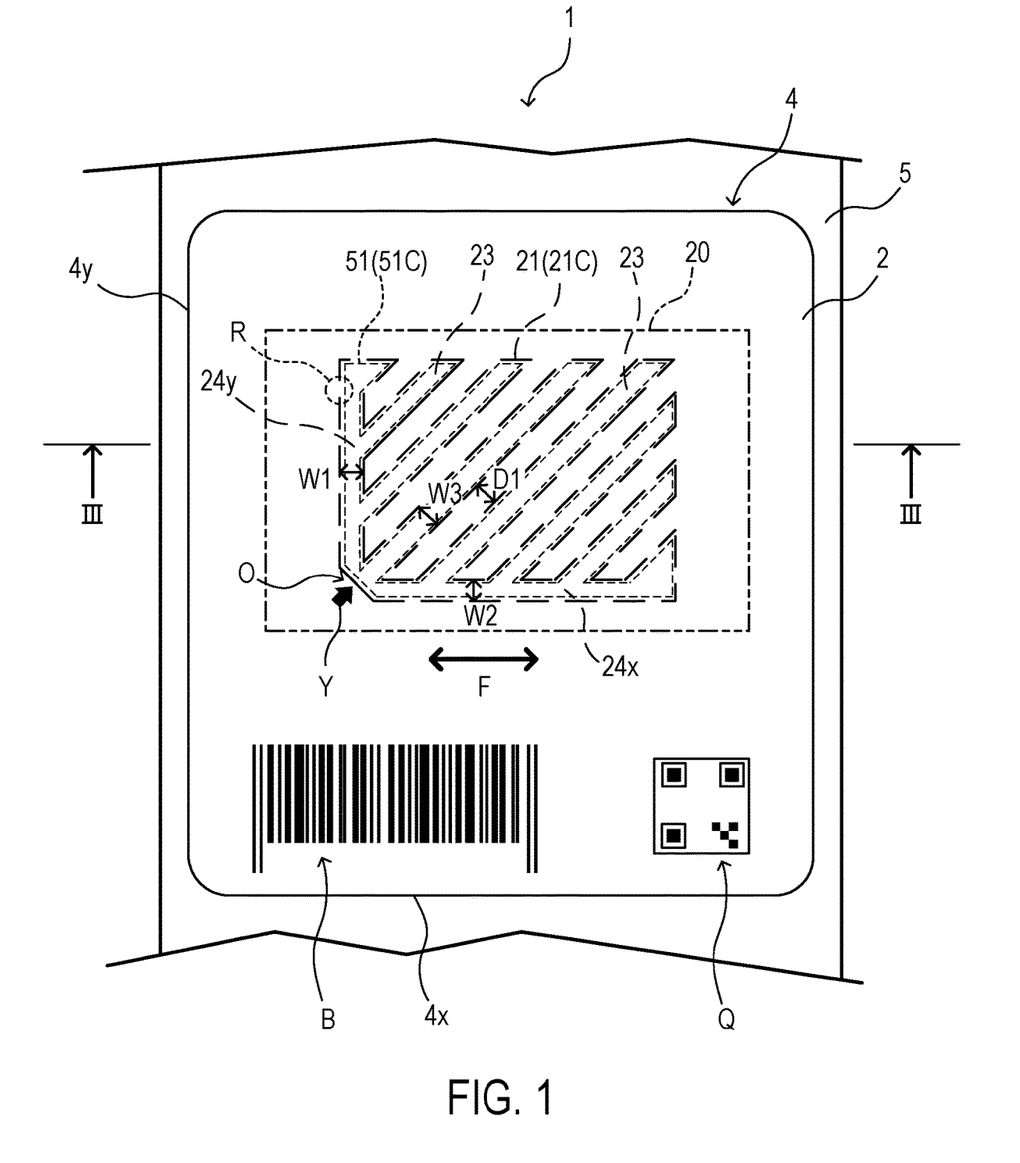
FIG. 1 is a plan view of a label structure according to a first embodiment of the invention, viewed from a front surface side.
Figure 2:
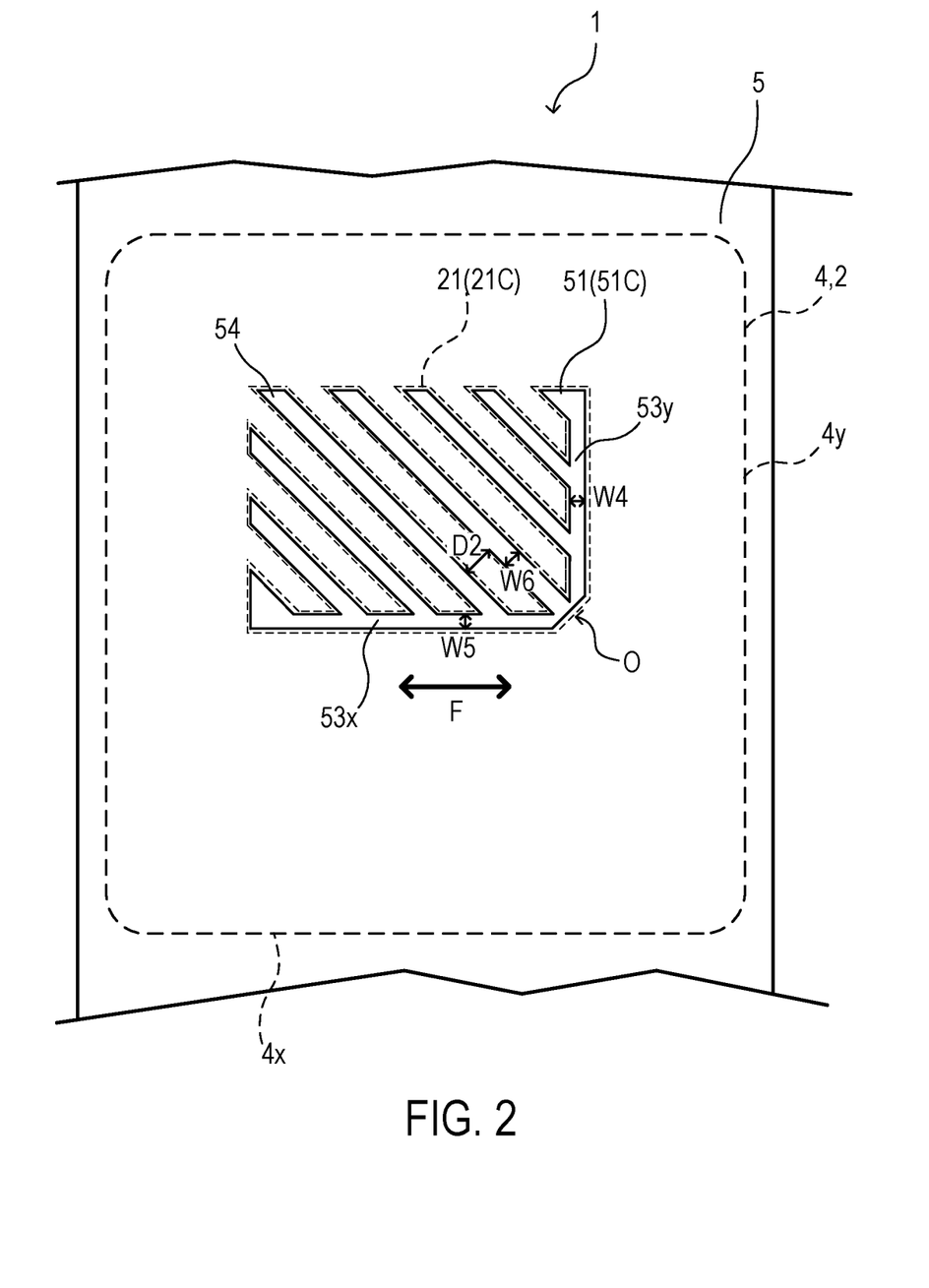
FIG. 2 is a plan view of the label structure, viewed from a back surface side.
Figure 3:
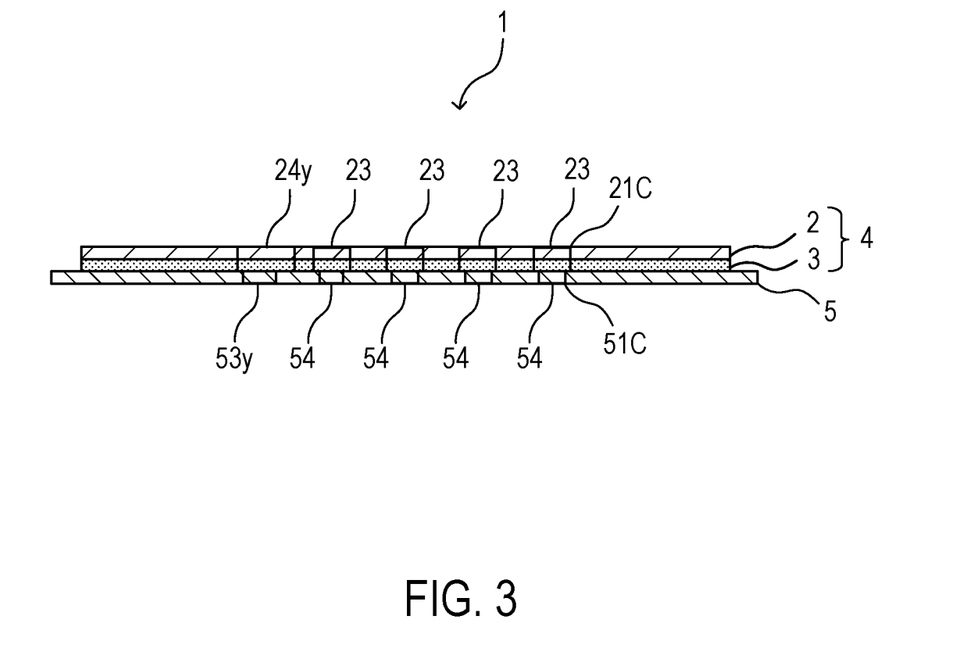
FIG. 3 is a cross-sectional view taken along a line III-III in FIG. 1.

FIG. 1 is a plan view of a label structure 1 according to a first embodiment, viewed from a front surface side. Further, FIG. 2 is a plan view of the label structure 1, viewed from a back surface side. FIG. 3 is a cross-sectional view taken along a line III-III in FIG. 1.

The label structure 1 includes a label 4 and a separator 5, the label 4 includes a base material 2 and an adhesive portion 3 laminated on the base material 2, and the separator 5 that covers the adhesive portion 3 is further laminated on the label 4.

In the present embodiment, a front surface of the label structure 1 is a front surface on which information such as a character string is printed, and corresponds to one surface of the base material 2. A back surface of the label structure 1 corresponds to a back surface of the separator 5 laminated on the other surface of the base material 2.

In the present embodiment, as an example of the label 4, a label 4 used as a so-called invoice or tag, which is to be adhered to a package as an adherend L (see FIG. 8), will be described.

The base material 2 includes a print area 20 on a front surface thereof. Information arranged in a predetermined direction is printed on the print area 20. The information to be printed includes a character string such as an address, a name, and a telephone number of a sender or an addressee. Further, the predetermined direction is a direction of an arrow F illustrated in FIG. 1, and indicates a direction in which a character string M (see FIG. 4) is written (hereinafter referred to as a character string direction F).

A base material partition portion 21 is formed in the print area 20. The base material partition portion 21 is partitioned by a base material tear-off line 21C. Further, the base material partition portion 21 includes main trunk portions 24x and 24y extending in a horizontal direction or vertical direction of the label 4, and a plurality of intersections 23 branching from the main trunk portions 24x and 24y and extending in a direction that intersects with the character string direction F.

The base material partition portion 21 is partitioned by the base material tear-off line 21C so as to be tore from the surrounding base material 2. Further, a mark Y (a black arrow in FIG. 1) for easily showing a removing start point O of the base material partition portion 21 to a user is printed at a predetermined position of the base material 2, that is, at lower left of the print area 20 in the present embodiment. Details of the base material partition portion 21 will be described later.

In addition to the print area 20, a bar code B and a two-dimensional code Q representing information necessary for delivery are printed on the front surface of the base material 2.

The bar code B and the two-dimensional code Q may be printed on the label structure 1 in advance before a character string such as an address, a name, and a telephone number of a sender or an addressee described later is printed, or may be printed together with the character string such as the address, the name, and the telephone number of the sender or the addressee.

In the present embodiment, as the base material 2, for example, a paper base material such as a cardboard, a wood-free paper, a wood-containing paper, or a coated paper obtained by appropriately forming a coating layer on these papers can be applied.

Further, as the base material 2, in addition to the paper base material described above, a resin film base material such as a single resin film of polyvinyl chloride, polyethylene terephthalate, polypropylene, polyethylene, polyethylene naphthalate, or the like, or a multilayer film obtained by laminating a plurality of these resin films can be used.

In the present embodiment, a thickness of the base material 2 may be 10 μm or more and 300 μm or less. When papers are used as the base material 2, within the above range, a paper having a thickness of 50 μm or more and 120 μm or less can be used. Generally, the thickness is preferably 80 μm to 110 μm.

Further, when a resin film is used as the base material 2, within the above range, the base material 2 can use a resin film having a thickness of 25 μm or more and 200 μm or less, and particularly 10 μm to 120 μm.

As illustrated in FIG. 3, the adhesive portion 3 is laminated on a surface of the base material 2 opposite to the surface on which the information is printed. As an adhesive that forms the adhesive portion 3, an acrylic-based, urethane-based, silicone-based, and rubber-based adhesive or binder can be used.

The separator 5 is obtained by, for example, coating a paper or a film with an ultraviolet curable silicone, a thermosetting silicone, a silicone solvent, an alkyl pendant polymer, or a fluorine-based release agent. These coated surfaces (surfaces of the separator 5) are temporarily adhered to the adhesive portion 3 in an overlapping manner.

Further, in the separator 5, as illustrated in FIG. 2, a separator partition portion 51 is formed as an area corresponding to the base material partition portion 21 (indicated by a broken line in FIG. 2). As illustrated in FIG. 2, the separator partition portion 51 is formed so as to be positioned in an area inside an outline of the base material partition portion 21. The separator partition portion 51 is partitioned by a separator tear-off line 51C.

In the label structure 1 having the configuration described above, the base material partition portion 21 partitioned by the base material tear-off line 21C can be tore from the label 4. Further, the base material partition portion 21 is tore from the label 4 in a state in which the separator partition portion 51 partitioned from the separator 5 is temporarily adhered to a back surface.

<Base Material Partition Portion and Separator Partition Portion>

Next, details of the base material partition portion 21 and the separator partition portion 51 will be described.

In addition to the intersections 23, the base material partition portion 21 includes a base material main trunk portion extending along an edge portion of the label 4. In the present embodiment, the label 4 has a substantially rectangular shape.

Therefore, the label 4 includes a vertical side portion 4y and a horizontal side portion 4x as edge portions. That is, in the label 4, the base material partition portion 21 includes a base material vertical main trunk portion 24y extending along the vertical side portion 4y of the label 4 and a base material horizontal main trunk portion 24x extending along the horizontal side portion 4x of the label 4 as the base material main trunk portions.

In the present embodiment, the base material vertical main trunk portion 24y and the base material horizontal main trunk portion 24x are connected to each other at one end, and the connected ends constitute the removing start point O.

As illustrated in FIG. 1, the mark Y (indicated by a thick black arrow in FIG. 1) for easily showing the removing start point to the user and a peeling direction thereof is printed on the removing start point O.

In the present embodiment, a width W1 of the base material vertical main trunk portion 24y and a width W2 of the base material horizontal main trunk portion 24x are configured to be constant. Further, a width W3 of the intersection 23 and a distance D1 between the intersections 23 are also configured to be constant.

The base material tear-off line 21C that partitions the base material partition portion 21 is formed by partially forming a slit that penetrates the base material 2 in a thickness direction. When the label 4 is adhered to the separator 5 or the adherend L, in order to prevent the base material partition portion 21 from being tore from the surrounding base material 2 and falling off, as indicated by a broken line circle in FIG. 1, the base material tear-off line 21C is formed with dotted portions R at predetermined intervals. That is, the base material tear-off line 21C has a coarse perforation line shape that partially penetrates the base material 2.

The separator partition portion 51 is formed in an area corresponding to a shape of the base material partition portion 21.

As illustrated in FIG. 2, the separator partition portion 51 includes a separator vertical main trunk portion 53y extending along the vertical side portion 4y of the label 4 and a separator horizontal main trunk portion 53x extending along the horizontal side portion 4x of the label 4. Further, the separator partition portion 51 includes a plurality of separator intersections 54 that branch off from the separator vertical main trunk portion 53y and the separator horizontal main trunk portion 53x and extend so as to intersect with the character string direction F.

The separator tear-off line 51C that partitions the separator partition portion 51 is a slit that penetrates the separator 5 in the thickness direction, and the separator tear-off line 51C is continuously formed over an outer periphery of the separator partition portion 51. Therefore, the separator partition portion 51 is completely tore from the surrounding separator 5.

A width W4 of the separator vertical main trunk portion 53y and a width W5 of the separator horizontal main trunk portion 53x are configured to be constant. Further, a width W6 of the separator intersection 54 and a distance D2 between the separator intersections 54 are also configured to be constant.

As illustrated in FIG. 2, the separator partition portion 51 is formed so as to be positioned in an area inside an outline of the base material partition portion 21. That is, the width W4 of the separator vertical main trunk portion 53y is narrower than the width W1 of the base material vertical main trunk portion 24y (W4<W1). Similarly, the width W5 of the separator horizontal main trunk portion 53x is narrower than the width W2 of the base material horizontal main trunk portion 24x (W5<W2). Further, the width W6 of the separator intersection 54 is narrower than the width W3 of the intersection 23 (W6<W3).

That is, the separator partition portion 51 is formed smaller than an opening formed in the base material 2 by removing the base material partition portion 21.

[Functions and Effects]

Hereinafter, functions and effects of the label structure 1 according to the present embodiment will be described.

Figure 4:
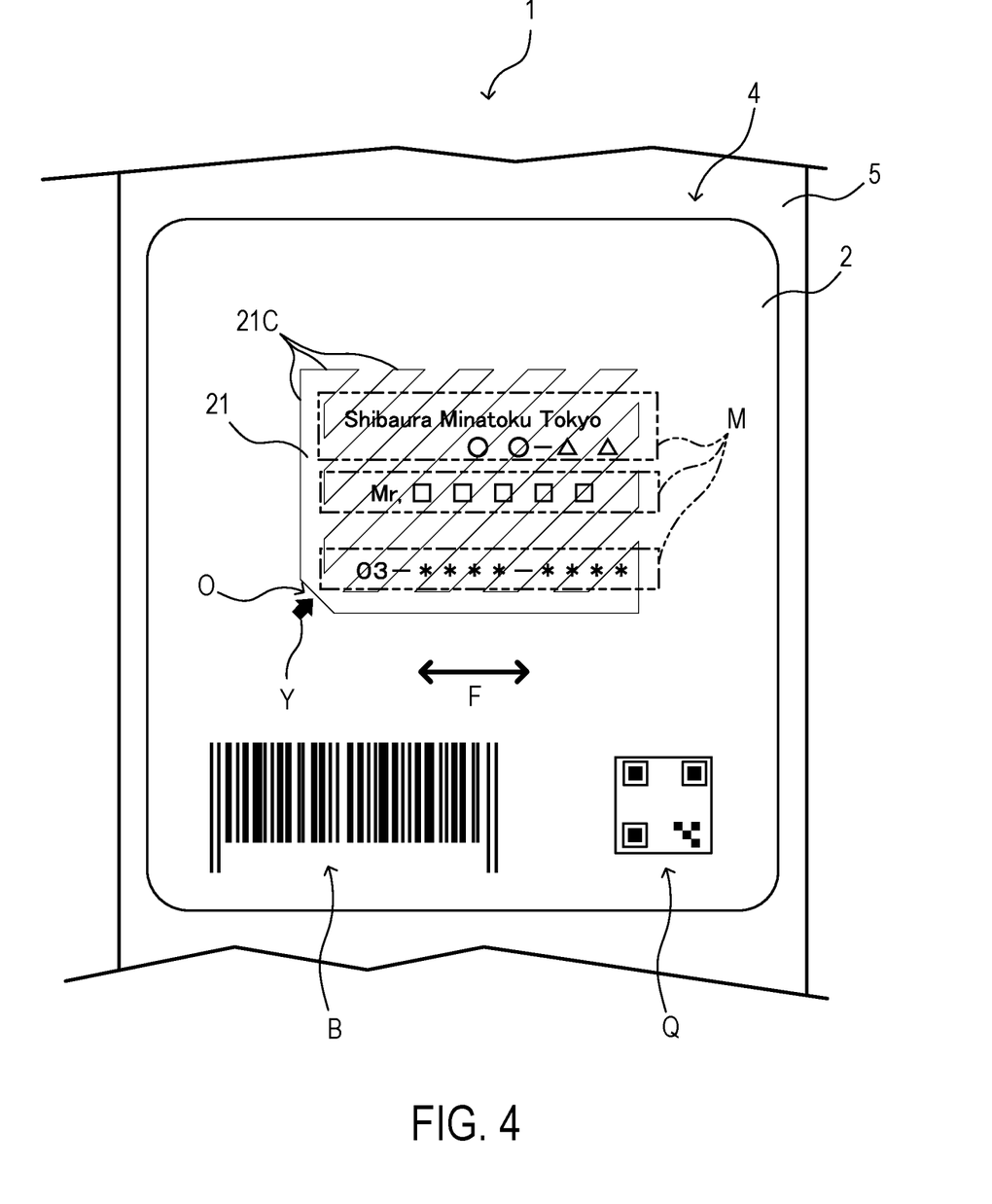
FIG. 4 is a plan view illustrating a label structure in which a character string is printed on a print area.

FIG. 4 is a plan view illustrating the label structure 1 in which a character string is printed on the print area 20. Although the base material tear-off line 21C that partitions the base material partition portion 21 is formed by a coarse perforation line, the base material tear-off line 21C is illustrated by a solid line in FIG. 4 in order to facilitate understanding of the drawing. As illustrated in FIG. 4, the label 4 can be printed with a character string arranged in a predetermined direction on the print area 20 by a printer. The printed label 4 is peeled off from the separator 5 and adhered to the adherend L.

Figure 5:
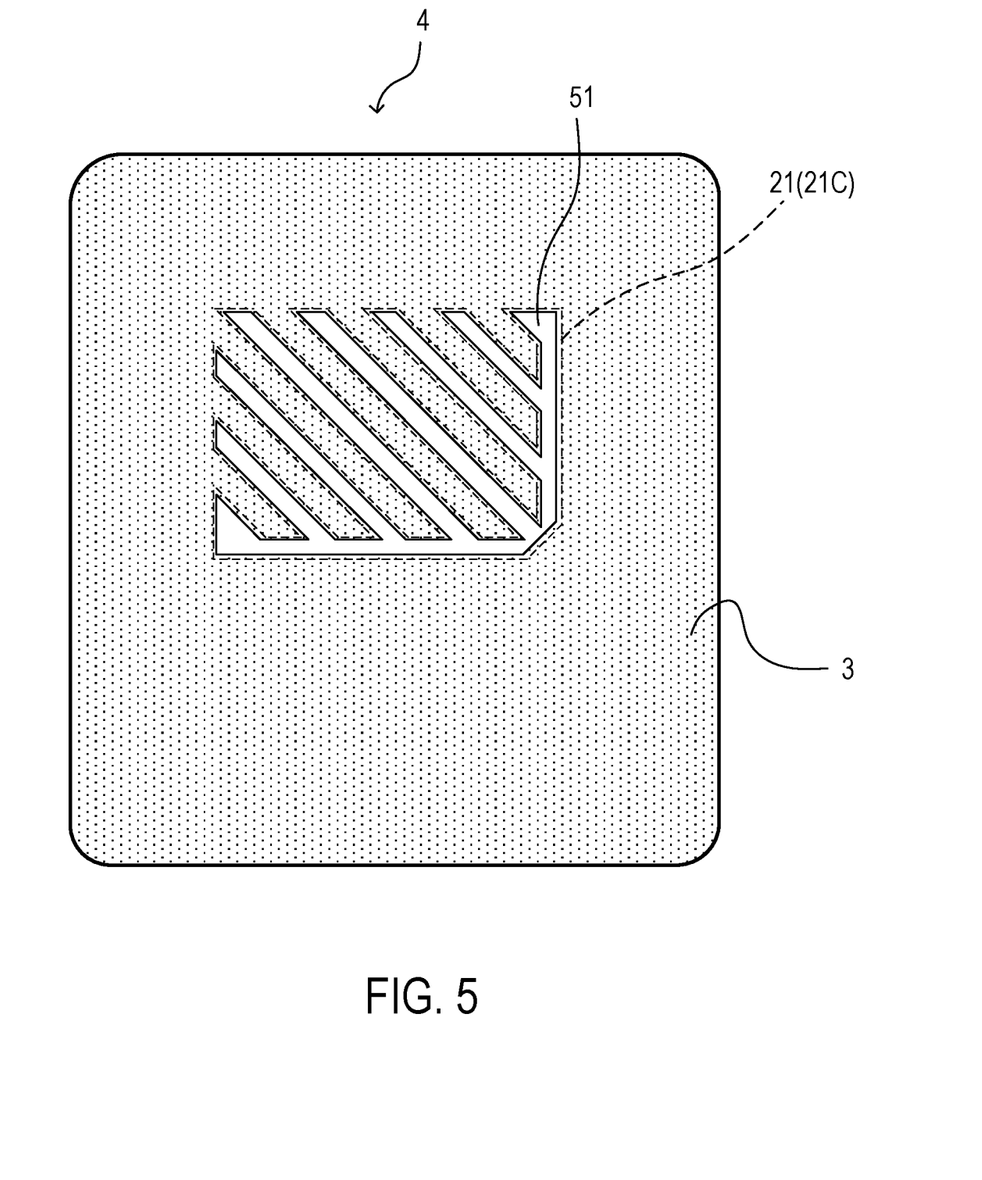
FIG. 5 is a plan view illustrating a state in which a label is peeled off from a separator of the label structure, viewed from a back surface side of the label.
Figure 6:
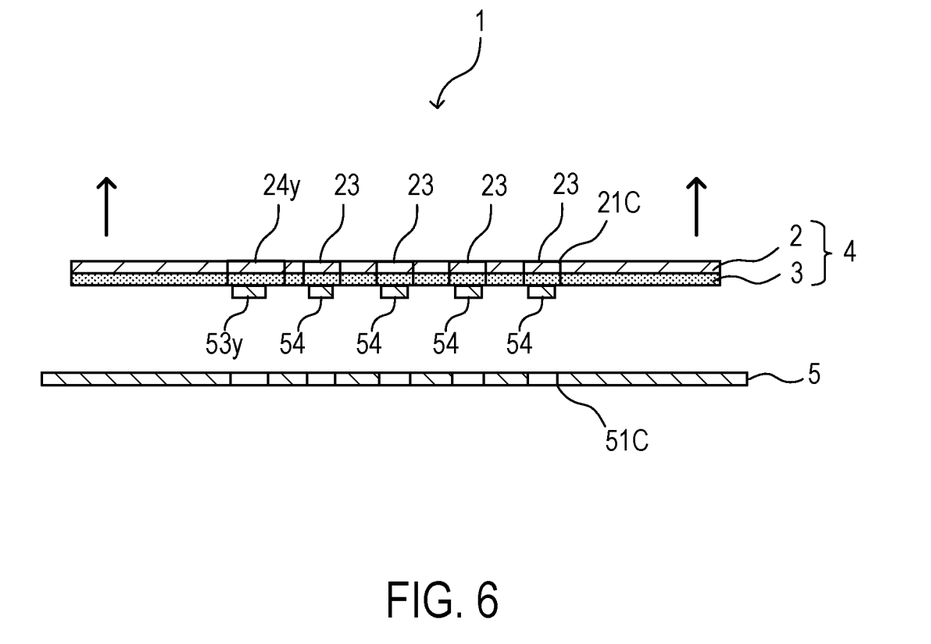
FIG. 6 is a diagram illustrating the state in which the label is peeled off from the separator of the label structure, using a cross section corresponding to a cross section in FIG. 3.

FIG. 5 is a plan view of a state in which the label 4 is peeled off from the separator 5, viewed from a back surface side of the label 4. FIG. 6 is a cross-sectional view illustrating, based on FIG. 3, a state in which the separator is peeled off from the label structure 1. Further, FIG. 7 is a cross-sectional view illustrating, based on FIG. 3, an aspect in which the label 4 peeled off from the separator of the label structure 1 is adhered to the adherend L.

As illustrated in FIG. 5 and FIG. 6, in the label structure 1 of the present embodiment, when the label 4 is peeled off from the separator 5, a part of the separator 5 (the separator partition portion 51) is adhered in a temporarily adhered state to the adhesive portion 3 on a back surface of the label 4 at a position corresponding to the base material partition portion 21.

Figure 7:
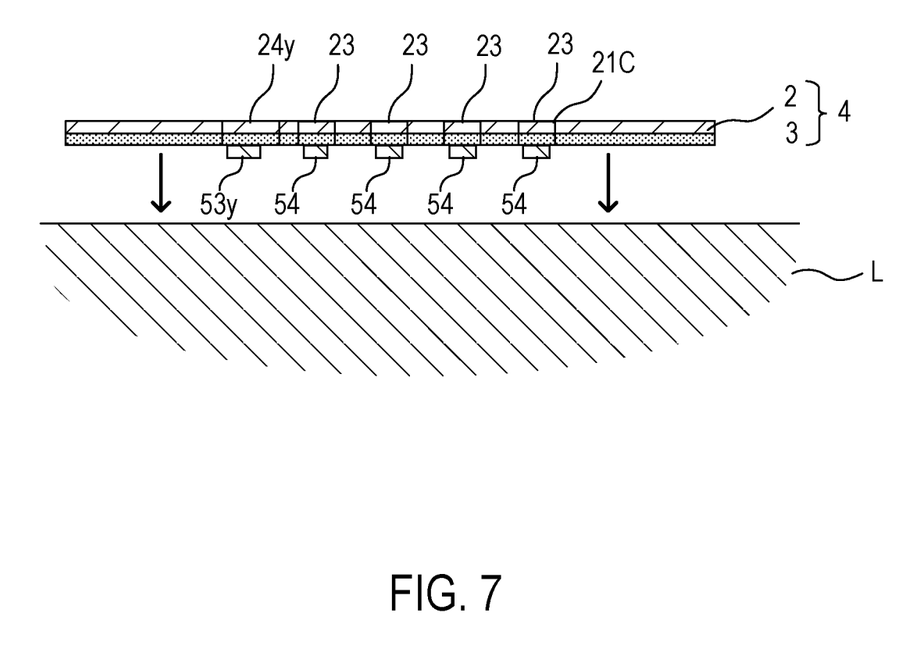
FIG. 7 is a diagram illustrating an aspect in which the label peeled off from the separator of the label structure is adhered to an adherend, using a cross section corresponding to the cross section in FIG. 3.

In the adhesive portion 3 on the back surface of the label 4, a part of the separator 5, that is, the separator horizontal main trunk portion 53x, the separator vertical main trunk portion 53y, and the separator intersection 54 of the separator partition portion 51 remain in an area corresponding to the base material partition portion 21 in a state in which the separator horizontal main trunk portion 53x, the separator vertical main trunk portion 53y, and the separator intersection 54 of the separator partition portion 51 are temporarily adhered, and therefore, as illustrated in FIG. 7, even when the label 4 is adhered to the adherend L, an area where the separator partition portion 51 of the adhesive portion 3 is left does not adhere to the adherend L by functioning as a non-adhesive portion.

On the other hand, when the label 4 is being used as an invoice label, an area of the adhesive portion 3 other than the separator partition portion 51 is adhered to the adherend L. Since the separator partition portion 51 left on the back surface of the label 4 is surrounded by the adhesive portion 3, the label 4 as a whole has sufficient adhesiveness and can maintain an adhered state even the area where the separator partition portion 51 is left does not adhere to the adherend L.

Therefore, the label 4 adhered to the package (the adherend L) is not easily peeled off even if the packages are stacked and outer surfaces of the adjacent packages rub against each other in a process of being delivered.

Figure 8:
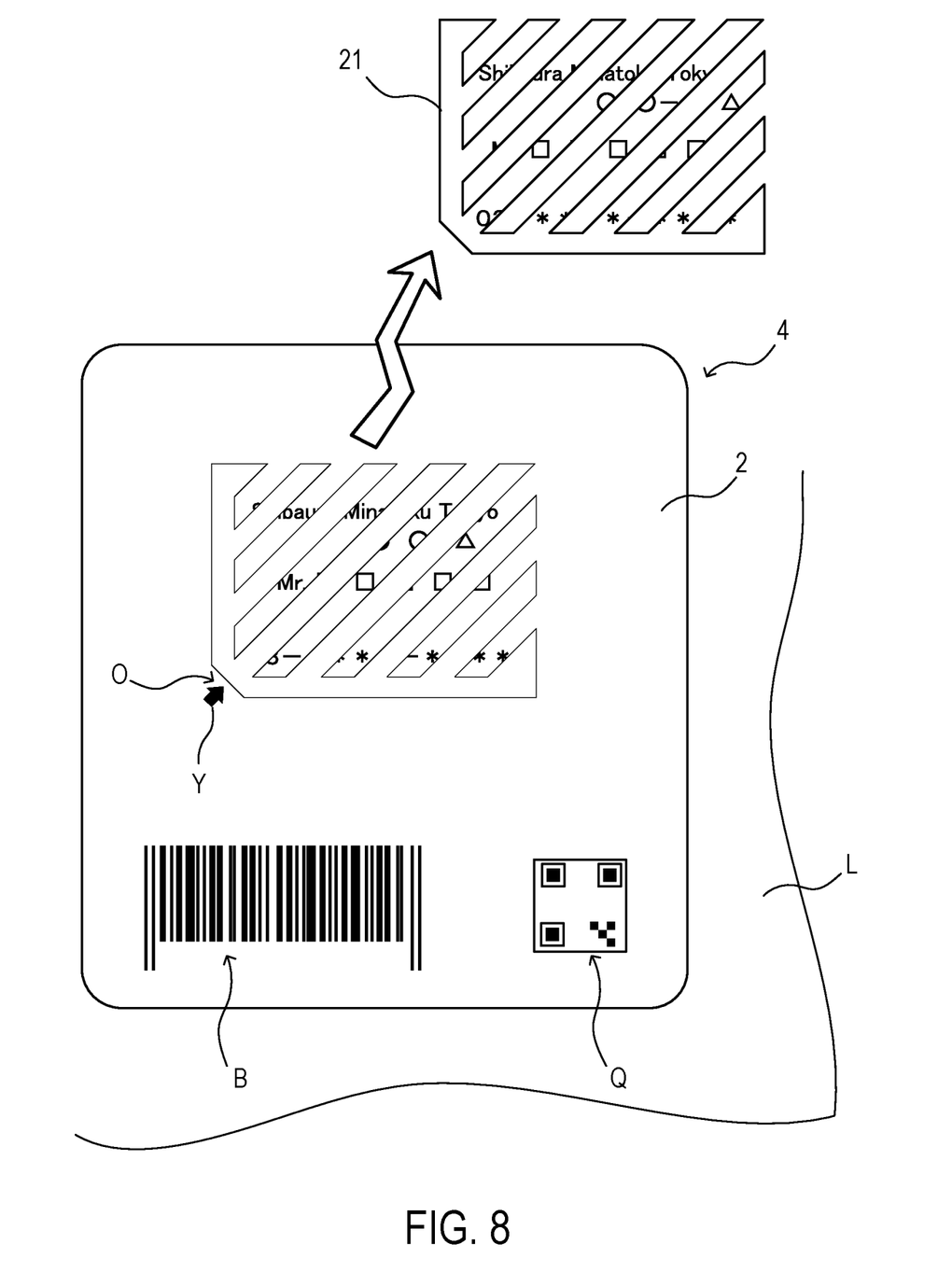
FIG. 8 is a schematic diagram illustrating a state in which a base material partition portion is tore from the label adhered to the adherend.
Figure 9:
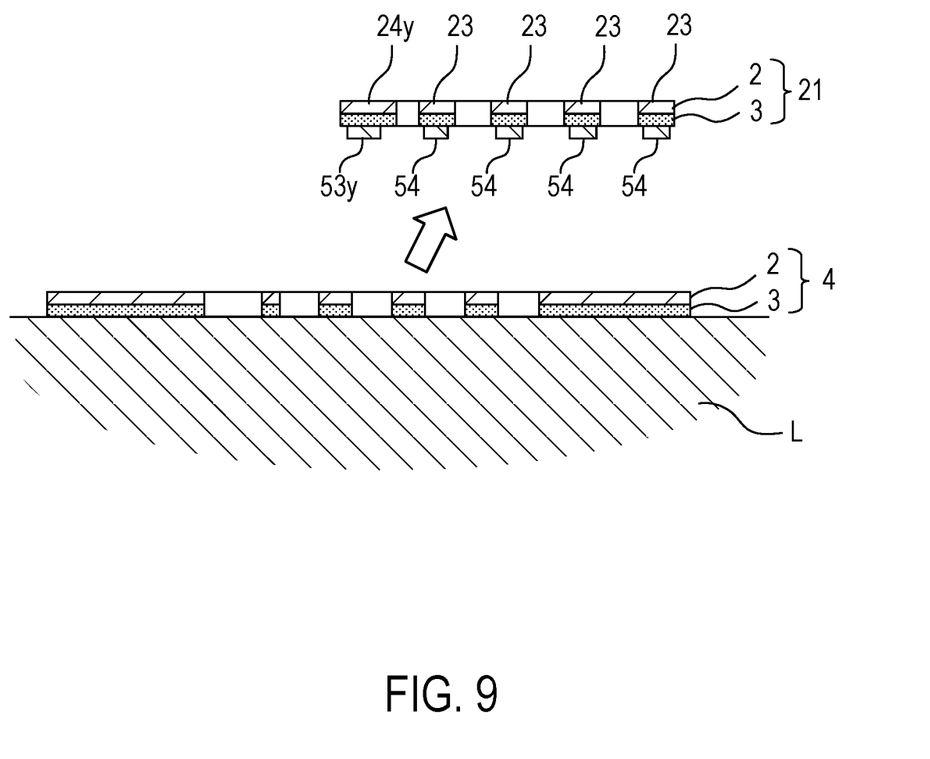
FIG. 9 is a diagram illustrating the state in which the base material partition portion is tore from the label adhered to the adherend, using a cross section corresponding to the cross section in FIG. 3.

FIG. 8 is a schematic diagram illustrating a state in which the base material partition portion 21 is tore from the label adhered to the adherend. Further, FIG. 9 is a cross-sectional view illustrating, based on FIG. 3, the state in which the base material partition portion is tore from the label adhered to the adherend.

When the base material partition portion 21 is tore from the label 4, it is necessary for the user to remove the base material partition portion 21 from the removing start point O in an arrow direction.

By this removing operation, the dotted portion R that connects the base material partition portion 21 and the surrounding base material 2 is broken, and the base material partition portion 21 is tore from the base material 2.

At this time, since the area of the adhesive portion 3 corresponding to the back surface of the base material partition portion 21 is blocked by the separator partition portion 51 and is not adhered to the adherend L, the base material partition portion 21 can be easily tore off when the base material partition portion 21 is tore from the label 4 along the base material tear-off line 21C.

Further, the separator partition portion 51 is formed to be smaller than the opening formed in the base material 2 by removing the base material partition portion 21. Therefore, the base material partition portion 21 can be smoothly peeled off. Further, an outer edge of the separator partition portion 51 is not caught by a through hole of the base material partition portion 21 formed in the base material 2.

Accordingly, the base material partition portion 21 can be easily tore from the label 4.

Further, by removing the base material partition portion 21 from the label 4, the intersection 23 formed so as to intersect with the character string direction F is tore from the base material 2, and the character string printed on the print area 20 is divided onto the base material 2 and the base material partition portion 21. Therefore, the character string that cannot be identified due to a part of the character string missing remains in the base material 2.

Accordingly, according to the label structure 1, the information printed on the base material 2 can be disposed in such a way that the information cannot be recognized by a third party, without using a shredder or the like.

Second Embodiment

<Configuration of Label Structure>

Figure 10:
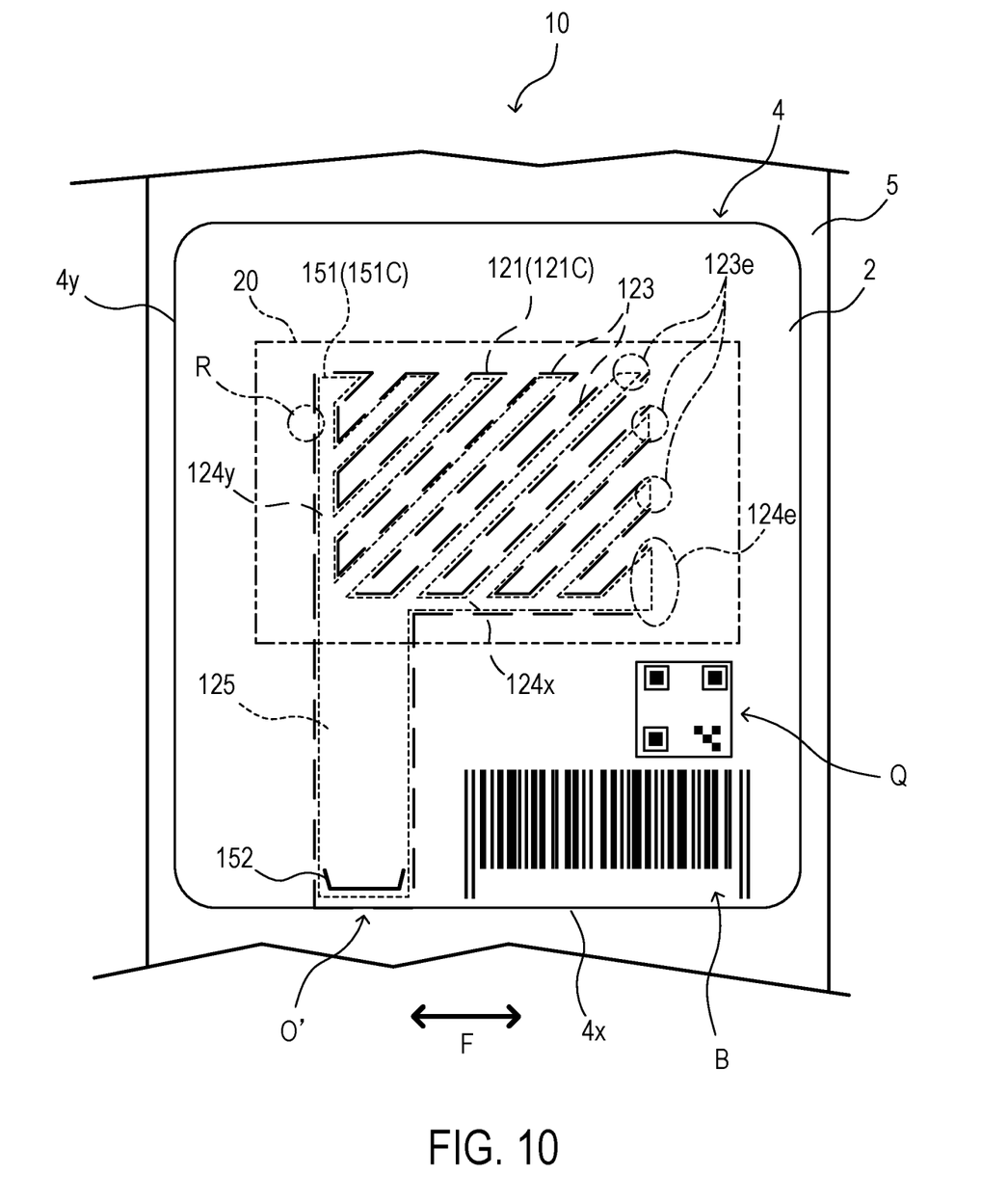
FIG. 10 is a plan view of a label structure according to a second embodiment, viewed from a front surface side.

FIG. 10 is a plan view of a label structure 10 according to a second embodiment, viewed from a front surface side.

In the label structure 10 according to the second embodiment, a base material partition portion 121 is formed in the print area 20 as in the first embodiment. A base material tear-off line 121C that forms an outline of the base material partition portion 121 is a perforation line that includes a cut portion in which a slit penetrating the base material 2 in the thickness direction is partially formed and an uncut portion that is not cut. The base material tear-off line 121C is formed with dotted portions R at predetermined intervals. Further, the base material tear-off line 121C is formed with base material continuous portions 123e and 124e having an uncut length longer than the dotted portion R.

The base material partition portion 121 includes a base material vertical main trunk portion 124y extending along the vertical side portion 4y of the label 4 and a base material horizontal main trunk portion 124x extending along the horizontal side portion 4x of the label 4. Further, the base material partition portion 121 includes a plurality of intersections 123 branching from the base material vertical main trunk portion 124y and the base material horizontal main trunk portion 124x and extending in a direction that intersects with the character string direction F.

Further, the base material partition portion 121 includes a tear-off piece portion 125. The base material vertical main trunk portion 124y is continuous with the tear-off piece portion 125 extending to an end of the label 4 in the direction intersecting with the character string direction F.

In the second embodiment, a portion of the tear-off piece portion 125 positioned at the end of the label 4 serves as a removing start point O'. The separator 5 is formed with a separator partition portion 151 partitioned by a separator tear-off line 151C extending to an area corresponding to the area of the tear-off piece portion 125. The separator partition portion 151 extends to immediately before the end of the label 4.

The base material continuous portion 123e is formed at each end of the plurality of intersections 123 opposite to a start point portion continuous with the base material vertical main trunk portion 124y or the base material horizontal main trunk portion 124x.

The base material continuous portion 124e is formed at an end of the base material horizontal main trunk portion 124x opposite to a side on which the tear-off piece portion 125 is formed.

The base material continuous portions 123e and 124e are portions where the base material 2 is continuous.

In FIG. 10, as in the first embodiment, the separator partition portion 151 is formed so as to be positioned in an area inside the outline of the base material partition portion 121. In the separator partition portion 151, a portion corresponding to the base material continuous portion 123e is also continuously cut. That is, the separator partition portion 151 is completely tore off from the surrounding separator 5 by the separator tear-off line 151C.

With the label structure 10 according to the second embodiment, the tear-off piece portion 125 is extended to the end of the label 4, and the corresponding separator partition portion 151 is also extended to immediately before the end of the label 4. Therefore, in the label 4 adhered to the adherend L, a vicinity of the tear-off piece portion 125 serves as a start point (removing start point O') for peeling off a part (the base material partition portion 121) of the label 4.

Therefore, when the user pinches an end of the tear-off piece portion 125 at the label 4 adhered to the adherend L and peels the end off, the base material partition portion 121 partitioned by the base material tear-off line 121C is peeled off in a comb shape along the intersections 123.

Then, when the base material partition portion 121 is peeled off to the base material continuous portions 123e and 124e, the base material 2 ahead of the base material continuous portions 123e and 124e is adhered to the adherend L, and thus the base material 2 ahead of the base material partition portion 121 is broken in an irregular manner. In many cases, the base material 2 is torn and broken into two layers, that is, a front surface side and an adhesive side.

Therefore, in addition to the character string printed on the print area 20 being divided onto the base material 2 and the base material partition portion 121, a part of the base material 2 is broken in an irregular shape even in a portion other than the base material partition portion 121, and thus an effect of preventing a third party from recognizing the information printed on the base material 2 is further enhanced.

In the label 4, a notch 152 that penetrates only the base material 2 or penetrates from the base material 2 to the separator 5 may be formed on the tear-off piece portion 125. The notch 152 functions as a peel-off margin of the tear-off piece portion 125. The notch 152 may have any shape and number as long as it serves as a start point for peeling off the tear-off piece portion 125.

OTHER EMBODIMENTS

Although the embodiments of the invention have been described above, the above embodiments are merely a part of application examples of the invention, and are not intended to limit the technical scope of the invention to the specific configurations of the above embodiments.

The width W1 of the base material vertical main trunk portion 24y may be formed so as to increase in width as a distance from the removing start point O increases. Further, the width W1 may be formed so as to decrease in width. The same applies to the width W2 of the base material horizontal main trunk portion 24x and the width W3 of the intersection 23.

As described above, when the shape of the base material partition portion 21 is changed, the shape of the separator partition portion 51 is also changed to a shape corresponding to the base material partition portion 21.

Further, the shape of the base material partition portion 21 is not limited to the shape illustrated in FIG. 1. For example, the intersection 23 may be formed in a radial shape from the removing start point O. Further, the outline of the base material partition portion 21 may include a curve.

In the present embodiment, it is described that the peeling direction from the removing start point O is from lower left to upper right, but the invention is not limited thereto. Further, a position of the removing start point O is not limited to the lower left. The direction may be any direction as long as the base material partition portion 21 can be peeled off along the direction in which the intersection 23 extends.

In the present embodiment, the separator partition portion 51 is formed in an area corresponding to the shape of the base material partition portion 21, but the separator partition portion 51 may have any shape as long as it is within the area corresponding to the shape of the base material partition portion 21 and can prevent the back surface of the base material partition portion 21 from being completely adhered to the adherend L. The separator partition portion 51 may be scattered in an island shape in the area corresponding to the base material partition portion 21.

The present application claims priority under Japanese Patent Application No. 2021-058193 filed to the Japan Patent Office on Mar. 30, 2021, and Japanese Patent Application No. 2022-56114 filed to the Japan Patent Office on Mar. 30, 2022, and entire contents of these applications are incorporated herein by reference.

The invention claimed is:

1. A label structure comprising:
a base material including a print area on which information arranged in a predetermined direction is printed on one surface of the base material;
an adhesive portion in which an adhesive is laminated on the other surface of the base material; and
a separator configured to cover the adhesive portion, wherein
at least the print area of the base material is formed with a base material partition portion partitioned by a base material tear-off line,
the base material partition portion includes a plurality of intersections extending in a direction intersecting with the predetermined direction, and
the separator is formed with a separator partition portion partitioned by a separator tear-off line in an area corresponding to at least a part of an area corresponding to the base material partition portion.

2. The label structure according to claim 1, wherein the separator partition portion is formed so as to be positioned in an area inside an outline of the base material partition portion.

3. The label structure according to claim 1, wherein the base material partition portion further includes a main trunk portion extending along an edge portion of a label that includes the base material and the adhesive portion, and
the intersections are connected to the main trunk portion at one end.

4. The label structure according to claim 3, wherein the label has a substantially rectangular shape, and
the main trunk portion includes a vertical main trunk portion formed along a vertical side portion of the label and a horizontal main trunk portion formed along a horizontal side portion of the label.

5. The label structure according to claim 1, wherein the base material tear-off line is a perforation line that partially penetrates the base material, and
the separator tear-off line is a slit that penetrates the separator in a thickness direction, and is continuously formed over an outer periphery of the separator partition portion.

6. The label structure according to claim 5, wherein the base material tear-off line that partitions the base material partition portion includes a cut portion that penetrates the base material and an uncut portion that does not penetrate the base material, and the uncut portion includes a dotted portion for connecting the base material partition portion to the base material and a base material continuous portion having an uncut length longer than the dotted portion.

7. The label structure according to claim 6, wherein the base material continuous portion is formed at least at an end of the intersection opposite to the end connected to the main trunk portion.

8. The label structure according to claim 4, further comprising:
a tear-off piece portion continuous with the main trunk portion along the vertical side portion of the label and extending to an end of the label, wherein
the separator partition portion is formed to extend over an area corresponding to at least a part of an area corresponding to the tear-off piece portion.

9. A label comprising:
a base material including a print area on which information arranged in a predetermined direction is printed on one surface of the base material;
an adhesive portion in which an adhesive is laminated on the other surface of the base material; and
a separator configured to cover the adhesive portion, wherein
at least the print area of the base material is formed with a base material partition portion partitioned by a base material tear-off line,
the base material partition portion includes a plurality of intersections extending in a direction intersecting with the predetermined direction, and
the adhesive portion is formed with a non-adhesive portion in an area corresponding to at least a part of an area corresponding to the base material partition portion, wherein
the non-adhesive portion is a portion of the separator that remains.

* * * * *